United States Patent
Schwarz et al.

(10) Patent No.: US 8,774,020 B2
(45) Date of Patent: Jul. 8, 2014

(54) DEVICE AND METHOD FOR DETERMINING A TRANSMISSION BEHAVIOR OF SUB-CHANNELS

(75) Inventors: Klaus-Dieter Schwarz, Neukeferloh (DE); Thomas Braun, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 616 days.

(21) Appl. No.: 12/530,348

(22) PCT Filed: Feb. 14, 2008

(86) PCT No.: PCT/EP2008/001136
§ 371 (c)(1),
(2), (4) Date: Sep. 8, 2009

(87) PCT Pub. No.: WO2008/107066
PCT Pub. Date: Sep. 12, 2008

(65) Prior Publication Data
US 2010/0046387 A1    Feb. 25, 2010

(30) Foreign Application Priority Data
Mar. 6, 2007   (DE) .......................... 10 2007 010 868

(51) Int. Cl.
*H04L 12/26* (2006.01)
(52) U.S. Cl.
USPC .......................................................... 370/252
(58) Field of Classification Search
None
See application file for complete search history.

(56) References Cited

U.S. PATENT DOCUMENTS

| | | | |
|---|---|---|---|
| 6,028,894 A | 2/2000 | Oishi et al. | |
| 2002/0127985 A1* | 9/2002 | Fransis | 455/188.1 |
| 2003/0032439 A1 | 2/2003 | Harris et al. | |
| 2004/0258132 A1* | 12/2004 | Hong | 375/130 |
| 2005/0047517 A1* | 3/2005 | Georgios et al. | 375/267 |
| 2006/0176868 A1* | 8/2006 | Schilling | 370/342 |
| 2010/0105406 A1* | 4/2010 | Luo et al. | 455/452.2 |

FOREIGN PATENT DOCUMENTS

| | | |
|---|---|---|
| DE | 10043894 A1 | 2/2002 |
| EP | 0969623 A2 | 1/2000 |
| EP | 1855403 A1 | 11/2007 |
| GB | 2347032 A | 8/2000 |
| WO | 2006092852 A1 | 9/2006 |

OTHER PUBLICATIONS

International Search Report, PCT/EP2008/001136, Sep. 3, 2008, pp. 1-12.
International Search Report, EP 99305082.2, Feb. 26, 2003, pp. 1-6.
International Preliminary Report on Patentability, PCT/EP2008/001136, Oct. 8, 2009, pp. 1-7.

* cited by examiner

*Primary Examiner* — Rhonda Murphy
(74) *Attorney, Agent, or Firm* — Ditthavong & Steiner, P.C.

(57) ABSTRACT

A device for a method for determining the transmission performance of sub-channels of a transmission channel in a radio-communication system is specified, where data-comprising signal carriers are generated for the setup of the transmission channel within the radio-communication system and accommodated in the sub-channels of the transmission channel, and the transmission performance of the sub-channels is determined on the basis of the signal sub-carriers superposed with interferers. In this context, each sub-channel occupies a separate bandwidth sub-range of a total bandwidth range of the transmission channel. The bandwidth sub-range is disposed within the bandwidth at a spacing distance from other bandwidth sub-ranges of the total bandwidth range, and the interferers are limited to the bandwidth sub-range allocated to the respective sub-channel.

16 Claims, 2 Drawing Sheets

DEVICE AND METHOD FOR DETERMINING A TRANSMISSION BEHAVIOR OF SUB-CHANNELS

CROSS-REFERENCE TO RELATED APPLICATION

The present application is a national phase application of PCT Application No. PCT/EP2008/001136, filed on Feb. 14, 2008, and claims priority to German Application No. 10 2007 010 868.2, filed on Mar. 6, 2007, the entire contents of which are herein incorporated by reference.

BACKGROUND OF THE INVENTION

1. Field of the Invention

The invention relates to a device and a method for determining a transmission performance of sub-channels of a transmission channel in a radio-communication system.

2. Discussion of the Background

A method and test device for measuring the spectrum in adjacent channels is known from DE 100 43 894 A1.

Architectures of the third and further mobile-telephone generations (UMTS, 3 GPP-LTE) are based primarily on the OFDM and OFDMA modulation method, which combines multi-carrier modulation in the OFDM method with the multiple-access method FDMA/TDMA. With the OFDM and OFDMA modulation methods, instead of a single signal carrier, a comparatively large number of signal sub-carriers, which are allocated to sub-channels of the transmission channel, are modulated and coded simultaneously for the transmission of information in a transmission channel.

Dependent upon the quality of the sub-channels of the transmission channel, the signal sub-carriers can be operated with different modulation and coding. In order to achieve an efficient exploitation of the transmission channel, coding, modulation and/or amplitude of the signal sub-carriers are adaptable with regard to the transmission performance of the transmission channel. This means that the transmission power can be adapted to a different transmission performance of the transmission channel by means of targeted power control or power regulation in order to minimise interference within the transmission channel and to improve the useful power of the signal sub-carrier. For this purpose, it is necessary to know the transmission performance of the transmission channel, in particular, of the sub-channels.

In order to determine the transmission performance of the sub-channels of the transmission channel within a radio-communication system, data-comprising signal sub-carriers are initially generated for the accommodation in the sub-channels. After the successful transmission of the data through the transmission channel, the signal sub-carriers and/or the data transmitted by means of the signal sub-carriers are investigated with regard to errors and analysed in order to determine the transmission performance of the transmission channel.

To investigate the performance of the transmission channel and its sub-channels in the presence of different types of interference parameters, which vary especially in a time and/or space dependent manner, and/or different types of parameters of the signal data carrier, especially modulation parameters, coding parameters and/or amplitude parameters, it is conventional to implement for every parameter configuration a separate investigation with regard to one of the interference parameters and/or one of the parameters of the signal-data carrier.

SUMMARY OF THE INVENTION

Embodiments of the invention therefore advantageously provide a device and a method, with which the transmission performance of sub-channels of a transmission channel in a radio-communication system can be determined, especially in the presence of different types of interference parameters, in a particularly cost-favourable and low-cost manner and also in a quick and reliable manner.

In order to determine the transmission performance of sub-channels of a transmission channel in a radio-communication system, in particular, a mobile-communication system, signal sub-carriers, which provide data, are initially generated for the setup of the transmission channel within the radio-communication system and accommodated in the sub-channels of the transmission channel. In this context, each sub-channel occupies a bandwidth sub-range of a total bandwidth range, which is allocated to the transmission channel, wherein the bandwidth sub-ranges do not overlap and are spectrally distanced from one another on the total bandwidth range. Moreover, interferers to be mixed with the signal sub-carriers are generated according to the invention in such a manner that the interferers are limited within the bandwidth respectively to the bandwidth sub-range of that sub-channel, to which the interferers are allocated. Accordingly, the interferers in the bandwidth allocated to the respective bandwidth sub-range do not overlap and are, moreover, spectrally distanced from one another.

For the implementation of the method, a transmission/reception device and at least one terminal device are provided within the radio-communication system, wherein the transmission channel is set up between the transmission/reception device and the terminal device through the generation of the signal sub-carriers, which comprise the data.

The advantages achieved with the invention consist especially in that the transmission performance for every individual sub-channel of the transmission channel can be determined simultaneously, even if the transmission channel is supplied with interferers of different types of interference parameters, for example, different interference signals and/or interference noise and/or with signal sub-carriers of different types of parameters, for example, modulation parameters, coding parameters and/or amplitude parameters. Furthermore, an overlapping of the bandwidth sub-ranges is avoided through the arrangement of directly and indirectly adjacent bandwidth sub-ranges on the total bandwidth range provided.

The spacing of directly or indirectly adjacent bandwidth sub-ranges also prevents spurious resonance of a signal data carrier on a bandwidth sub-range allocated to the latter from influencing other signal-data carriers accommodated in adjacent bandwidth sub-ranges. Moreover, the device according to the invention and the method according to the invention allow the parameters of the signal sub-carrier to be adapted particularly rapidly to the sub-channels allocated to the latter for a particularly-efficient exploitation of the transmission channel through simultaneous determination of the transmission performance of the sub-channels of the transmission channel and also allow the achievement of an increase in the data rate of the data transmitted via the signal-data carrier through the efficient exploitation of the transmission channel.

By preference, the transmission/reception device generates the interferers. The transmission/reception device and/or the terminal device are expediently designed in order to determine the transmission performance on the basis of the signal sub-carriers superposed with the interferers.

According to an advantageous embodiment, an error detection, preferably of the data, which are transmitted by means of the signal sub-carriers, is implemented in order to determine the transmission performance of the sub-channels. The error detection is expediently implemented by means of error-detection methods, in particular, by means of cyclical redundancy checking CRC and/or by means of ACK/NAK signals.

In the case of the application of a cyclical redundancy check CRC, the terminal device preferably returns to the transmission/reception device a checksum determined from the received data for error detection of the data transmission.

In the case of the application of the ACK/NAK signals, the terminal device expediently transmits an ACK signal (confirmation, acknowledgement) to the transmission/reception device in order to acknowledge the reception or respectively an error-free transmission of the data transmitted by means of the signal sub-carrier, or a NAK signal (negative-confirmation, negative acknowledgement), in order to indicate an error transmission of the data.

By preference, the error detection is implemented in the transmission/reception device. For this purpose, the data transmitted from the transmission/reception device to the terminal device are at least partially returned to the transmission/reception device. This preferably occurs by means of loopbacks, wherein the transmission/reception device with the transmission channel and the terminal device forms a type of loop circuit, a so-called loopback. In this context, the terminal device supplies to the loop circuit either the received signal together with the data or only an acknowledgement signal in order to inform the transmission/reception device.

In an expedient further development, the transmission performance of the sub-channels is determined from the error detection by measuring the bit-error rate from the ratio of the number of erroneously-transmitted data bits relative to the total number of transmitted data bits by determining the block-error rate and/or the cell-loss rate.

In this context, the bit-error rate, the block-error rate and/or the cell-loss rate are preferably determined by the transmission/reception device.

According to an advantageous embodiment, several sub-channels are set up between the transmission/reception device and the terminal device, especially for the formation of a downlink channel separated from an uplink channel. One sub-channel is expediently provided for every signal sub-carrier.

According to an advantageous embodiment, protective bandwidth ranges are provided between the bandwidth sub-ranges on the total bandwidth range. The protective bandwidth ranges serve to prevent the overlapping of bandwidth sub-ranges and to minimise the mutual influence of two signal sub-carriers accommodated in adjacent bandwidth sub-ranges.

According to an advantageous embodiment, the interferers are formed as interference signals and/or as a superposition of several interference signals, in particular, as additive white Gaussian noise, as a modulated or a continuous signal. The interferers expediently differ in frequency, bandwidth, amplitude and/or phase.

In an expedient further development, the bandwidth sub-regions occupied by the signal sub-carriers comprise different bandwidths. By preference, the signal sub-carriers are differently modulated and/or channel coded. The data rates transmitted by the signal sub-carriers are expediently of different magnitude.

By preference, the transmission/reception device is designed as a system simulator with the function of generating the signal sub-carriers and preferably the interferers and determining the transmission performance of the sub-channels.

In an expedient further development, the device comprises an interference-signal generator for generating the interferers, which can preferably be integrated within the radio-communication system for the coupling of the interferers into the transmission channel. By preference, the interference-signal generator is designed as a vectorial-signal generator.

BRIEF DESCRIPTION OF THE DRAWINGS

An exemplary embodiment of the invention is described in greater detail below with reference to the drawings. The drawings are as follows.

DETAILED DESCRIPTION OF EXEMPLARY EMBODIMENTS OF THE INVENTION

Figure 1:
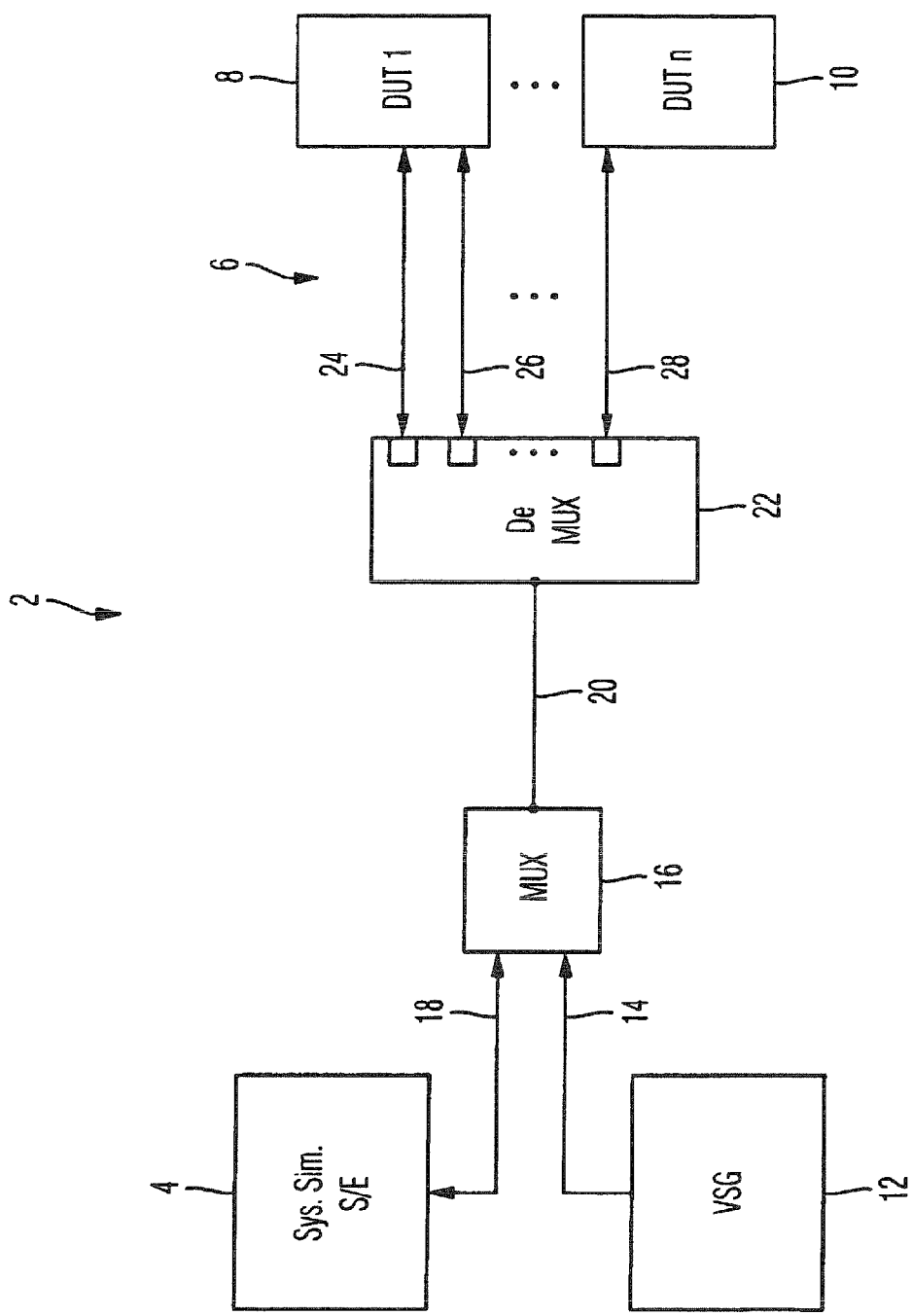
FIG. 1 shows schematically the radio-communication system with transmission/reception device and terminal devices.

FIG. 1 shows a device 2 with a transmission/reception device 4 and a radio-communication system 6 with terminal devices 8, 10. The device 2 according to the illustrated exemplary embodiment also comprises an interference-signal generator 12, which generates interferers in the form of one or more superposed interference signals, especially interference noise, and supplies the interferers via a signal line 14 to a multiplexer 16. The multiplexer 16 mixes the interferers with the data-transmitting signal carrier, which is generated by the transmission/reception device 4, supplied to the multiplexer 16 via a signal line 18, and provided via a signal line 20 to a de-multiplexer 22. The de-multiplexer 22 subdivides the signal carrier into several signal-sub-carriers and accommodates the signal sub-carriers in sub-channels 24, 26, 28 of a transmission channel formed within the radio-communication system 6.

The sub-channels 24, 26, 28 form radio connections between the transmission/reception device 4 and the terminal devices 8, 10 within the radio-communication system 6. The terminal devices 8, 10 are the devices under test (Device Under Test DUT).

Within this context, two sub-channels 24, 26 are allocated to the terminal devices 8, 10 within the transmission channel, wherein one of the sub-channels 24 serves as the uplink channel, and the other sub-channel 26 serves as the downlink channel of the terminal device 8.

In order to determine the transmission performance of the sub-channels 24, 26, 28, an error detection is implemented in the terminal device 8, 10 allocated to the respective sub-channel 24, 26, 28 and/or in the transmission/reception device 4.

In the first case, the error detection is implemented in the terminal device 8, 10 by means of cyclical redundancy checking in order to generate a checksum and/or by means of a method for generating an ACK signal (acknowledgement signal) or an NAK signal (negative acknowledgement signal), wherein the checksum or respectively the ACK signal or the NAK signal are communicated to the transmission/reception device 4 for the evaluation of the error detection by determining the bit-error rate, the block-error rate and/or the cell-loss rate.

In the second case, the error detection is implemented by the transmission/reception device 4, wherein the terminal devices 8, 10 serve only to route the transmitted data to the transmission/reception device 4.

Figure 2:
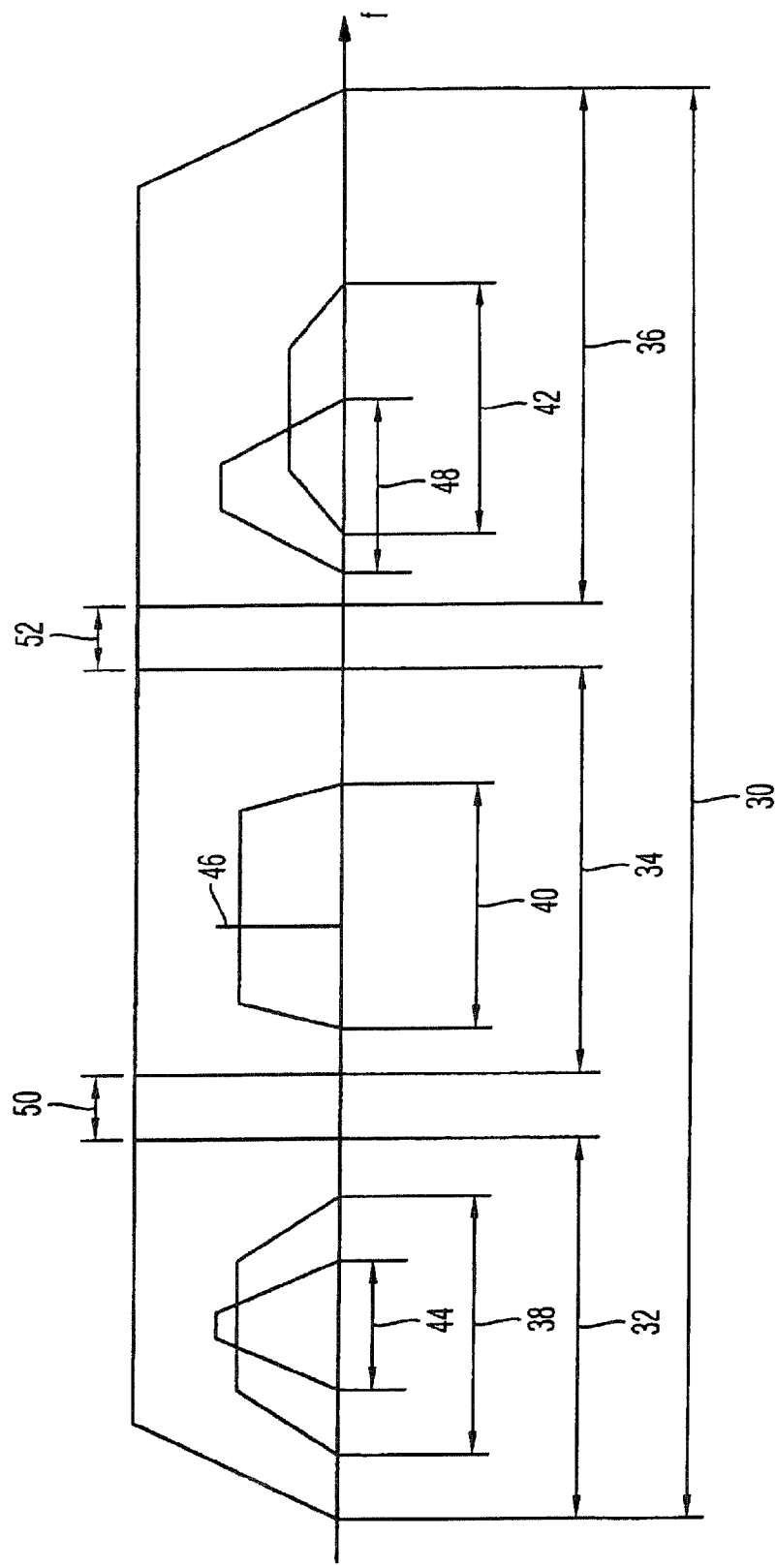
FIG. 2 shows a total bandwidth range of a transmission channel comprising a bandwidth sub-range.

FIG. 2 shows the formation of the transmission channel at the frequency f. A total bandwidth range 30, which is subdivided into bandwidth sub-ranges 32, 34, 36, is allocated to the transmission channel. In each case, one signal sub-carrier 38,

40, 42, which is simultaneously superposed by an interferer 44, 46, 48, is accommodated in every bandwidth sub-range 32, 34, 36. In this context, the signal sub-carriers 38, 40, 42 and the interferers 44, 46, 48 are band-limited in such a manner that the respective signal sub-carrier 38, 40, 42 and the respective interferer 44, 46, 48 occupies only the bandwidth sub-range 32, 34, 36 allocated to the latter and is distanced by one bandwidth of a protective bandwidth range 50, 52 from the adjacent bandwidth sub-range 32, 34, 36.

Since the bandwidth sub-ranges 32, 34, 36 do not overlap one another within the bandwidth, the transmission performance of the sub-channels 24, 26, 28 occupied by the bandwidth sub-ranges 32, 34, 36 (see FIG. 1) can be determined for every individual sub-channel 24, 26, 28 by simultaneous investigation of all sub-channels 24, 26, 28.

Accordingly, a particularly-rapid determination of the transmission performance of the sub-channels of the transmission channel is possible. The simultaneous implementation of the investigation of the transmission performance of all sub-channels is guaranteed even if the signal sub-carriers accommodated in the sub-channels are supplied with different interferers.

Accordingly, the signal carriers with the superposed interferers can be modulated in different ways, formed as time-continuous or time-discrete signals and/or can provide different signal-noise ratios. Moreover, the capacity of the data rates of the signal sub-carriers can be of different magnitude.

The invention is not restricted to the exemplary embodiment illustrated in the drawings. In particular, not to the subdivision of the bandwidth sub-ranges and of the protective bandwidth ranges within the total bandwidth range illustrated in the exemplary embodiment. All of the features described above and illustrated in the drawings can be combined with one another as required.

The invention claimed is:

1. A device for determining transmission performance of sub-channels of a transmission channel in a radio-communication system, the device comprising:
    a transmission/reception device configured to setup the transmission channel between the device and at least one terminal device provided in the radio-communication system, to generate respective data-transmitting signal sub-carriers for accommodation of the sub-channels, and to determine simultaneously the transmission performance of the sub-channels based at least in part on a plurality of interference signals, each superposed and transmitted on a respective one of the signal sub-carriers,
    wherein each sub-channel occupies a separate bandwidth sub-range of a total bandwidth range of the transmission channel, and each bandwidth sub-range is distanced from other bandwidth sub-ranges within the total bandwidth range in a manner whereby the bandwidth sub-ranges do not overlap one another within the bandwidth range, and
    wherein the device further comprises an interference-signal generator configured to generate the interference signals, wherein each bandwidth sub-range is super-positioned with a respective one of the interference signals of a correspondingly limited bandwidth, wherein the interference signals are spectrally distanced from one another in a manner whereby each interference signal is limited within the bandwidth sub-range with which it is super-positioned.

2. The device according to claim 1, wherein one or more of the transmission/reception device and the terminal device are configured to implement error detection of data communicated via the signal sub-carriers.

3. The device according to claim 2, wherein the transmission/reception device is further configured to determine the transmission performance of the sub-channels by measuring one or more of a bit-error rate, a block-error rate and a cell-loss rate from the error detection.

4. The device according to claim 1, wherein one sub-channel is provided for every signal sub-carrier.

5. The device according to claim 1, wherein several sub-channels are set up with the transmission/reception device.

6. The device according to claim 1, wherein, for a distancing of the bandwidth sub-ranges, protective bandwidth ranges are provided between the bandwidth sub-ranges.

7. The device according to claim 1, wherein the interferes differ in one or more of frequency, amplitude and phase.

8. The device according to claim 1, wherein the bandwidth sub-ranges occupied by the signal sub-carriers provide different bandwidths.

9. The device according to claim 1, wherein the signal sub-carriers differ from one another in one or more of a data rate, a type of modulation and a type of channel coding.

10. The device according to claim 1, wherein the transmission/reception device is a system simulator.

11. The device according to claim 1, wherein the interference-signal generator is a vectorial-signal generator.

12. The device according to claim 1, wherein each bandwidth sub-range is super-positioned with the respective interference signal in a respective position within the bandwidth sub-range, and includes a respective type of interference parameter.

13. A method for determining transmission performance of sub-channels of a transmission channel in a radio-communication system, the method comprising:
    establishing the transmission channel between a device for determining the transmission performance of the sub-channels and at least one terminal device within the radio-communication system;
    generating respective data-transmitting signal sub-carriers for accommodating the sub-channels of the transmission channel;
    determining simultaneously the transmission performance of the sub-channels based at least in part on a plurality of interference signals, each superposed and transmitted on a respective one of the signal sub-carriers, wherein each sub-channel occupies a separate bandwidth sub-range of a total bandwidth range of the transmission channel, and each bandwidth sub-range is distanced from other bandwidth sub-ranges within the total bandwidth range in a manner whereby the bandwidth sub-ranges do not overlap one another within the bandwidth range; and
    generating the interference signals, wherein each bandwidth sub-range is super-positioned with a respective one of the interference signals of a correspondingly limited bandwidth, wherein the interference signals are spectrally distanced from one another in a manner whereby each interference signal is limited within the respective bandwidth sub-range with which it is super-positioned.

14. The method according to claim 13, wherein, in order to determine the transmission performance, an error detection of the data, which are transmitted via the signal sub-carrier, is implemented by one or more of cyclical redundancy checking and acknowledgement/negative-acknowledgement signals, and wherein the acknowledgement/negative-acknowledgement signals are generated by a terminal device for a reception of the data transmitted via the signal sub-carriers and transmitted to a transmission/reception device, from which the terminal devices receive the data.

15. The method according to claim 14, wherein the transmission performance of the sub-channels is determined by measuring one or more of a bit-error rate, a block-error rate and a cell-loss rate from the error detection.

16. The method according to claim 13, wherein each bandwidth sub-range is super-positioned with the respective interference signal in a respective position within the bandwidth sub-range, and includes a respective type of interference parameter.

* * * * *